United States Patent [19]

Ray

[11] 4,039,086

[45] Aug. 2, 1977

[54] LOAD BALANCE, DOUBLE BUCKET CABLE STAY CRANE WITH LOAD SENSING MEANS

[76] Inventor: Louis F. Ray, P.O. Box 14702, Baton Rouge, La. 50808

[21] Appl. No.: 705,181

[22] Filed: July 14, 1976

[51] Int. Cl.$^2$ .................. B66C 23/00; B66C 13/16
[52] U.S. Cl. .................................. 212/47; 212/2; 214/2; 212/48; 212/63
[58] Field of Search .......... 212/2, 39 R, 39 B, 39 DB, 212/40–42, 47–48, 54–56, 61–63, 79–80, 86; 214/2

[56] References Cited

U.S. PATENT DOCUMENTS

| 654,739 | 7/1900 | Lancaster | 212/47 |
|---|---|---|---|
| 763,222 | 6/1904 | Van Driessche | 212/47 |
| 1,507,598 | 9/1924 | Gustafson | 212/2 X |
| 2,667,275 | 1/1954 | Llanusa | 212/2 |

Primary Examiner—Robert J. Spar
Assistant Examiner—R. B. Johnson
Attorney, Agent, or Firm—Sughrue, Rothwell, Mion, Zinn and Macpeak

[57] ABSTRACT

A horizontal gantry centered on the vertical tower of a crane supports on each side of the tower trolleys which move in unison in opposite directions at similar speed towards and away from the tower. Bulk material buckets are suspended from respective trolleys by vertical hoist cables. Sensors sense the loads of the buckets which are then compared, and the hoist and trolley drive motors are controlled to maintain load equilibrium on the crane to permit the buckets to be raised and the trolleys moved only when substantially equal loads are carried by the buckets.

9 Claims, 8 Drawing Figures

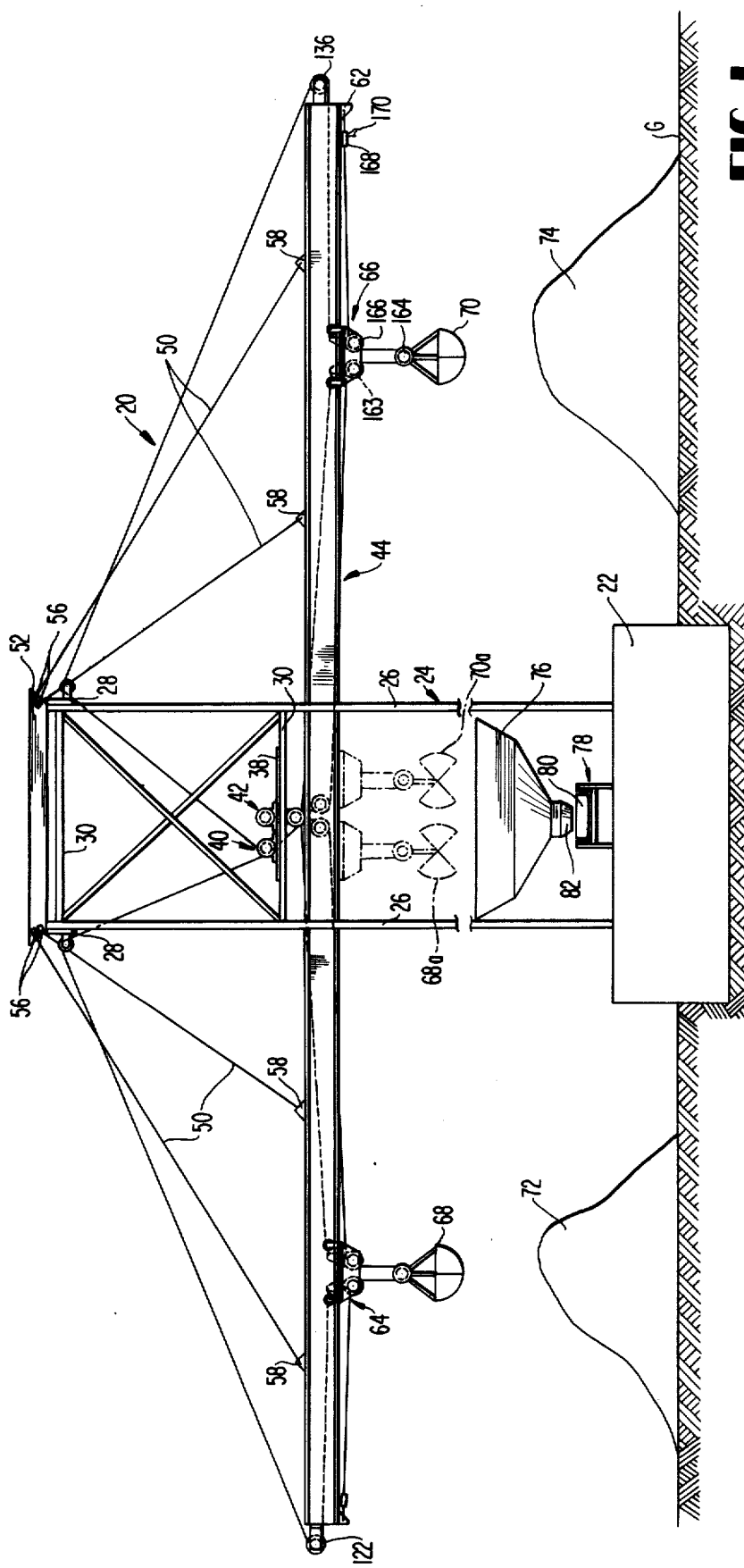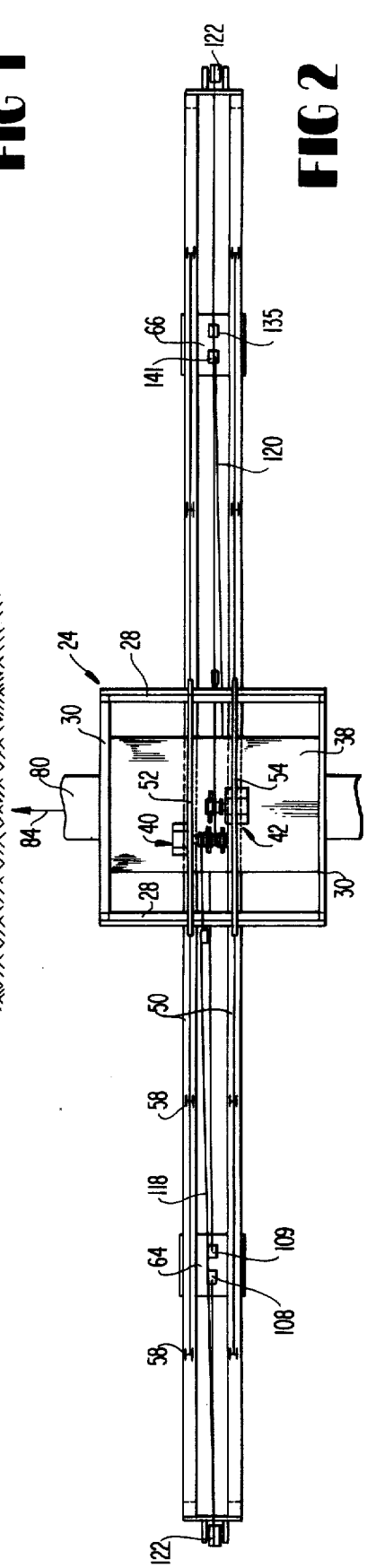

LOAD BALANCE, DOUBLE BUCKET CABLE STAY CRANE WITH LOAD SENSING MEANS

BACKGROUND OF THE INVENTION

1. Field of the Invention

This invention pertains to cranes, and more particularly to a cable stay crane in which multiple loads are moved between spaced positions with minimum applied stress to the crane.

2. Statement of the Prior Art

Gantry cranes have long been in existence wherein a horizontally extending gantry defines a track for a movable load trolley and is supported either at its center or at both ends for permitting a load to be lifted vertically by cable means in a direction towards the trolley and transported between longitudinally spaced positions underlying the gantry. Where such gantry crane is supported at its center, counterweight means on one side of the gantry center support have been previously utilized to compensate for the trolley supported load on the opposite side thereof. Insofar as known, the present invention represents the first such gantry type crane, wherein a working load is transported between two positions on a portion of the gantry to one side of the gantry center support, while a second equal load is transported between two positions by a second trolley on the opposite side of the center support and moved at the same speed to continuously equalize the applied load acting through the gantry on that center support.

SUMMARY OF THE INVENTION

The present invention constitutes a continuously balanced double load gantry crane including a base upon which a substantially vertical tower is fixedly mounted and rises upwardly therefrom. The gantry is mounted to the tower above the base and has portions extending horizontally outwardly from opposite sides of the tower. A trolley is track mounted for movement horizontally along the gantry on each of said two portions. A load carrying member is provided for each trolley and a lift assembly including a first motor means and vertically movable hoist cable means connected to said first motor means suspends said load carrying members from said trolleys for raising and lowering said load carrying members vertically relative to respective trolleys. The crane further provides a trolley travel assembly including second motor means and travel cable means coupling said motor to respective trolleys for causing said trolleys to move simultaneously horizontally along said gantry in opposite directions at similar speeds for maintaining the trolleys during travel at the same relative position with respect to the tower. The present invention involves the use of load measuring devices for measuring the loads of the load carrying members and load comparator means for controlling operation of at least said first motor means to prevent lifting of said loads unless said loads are substantially equal.

It is, therefore, a principal object of the present invention to avoid accidental overloading of either side of a central tower mounting horizontal double load gantry crane. An ancillary objective of the present invention is to improve the efficiency of operation of such gantry crane by preventing crane operation in the absence of substantial balancing of the loads of the load carrying members on respective sides of the gantry tower.

It is likely that this invention will be used in the mining of sub-aqueous materials and would be barge-mounted.

Additional objects and advantages of the invention will become apparent to those skilled in the art from a consideration of the following specification and when read in conjunction with the annexed drawings.

BRIEF DESCRIPTION OF THE DRAWINGS

FIG. 1 is a side elevational view of one embodiment of the load balanced double bucket cable stay gantry crane of the present invention.

FIG. 2 is a top plan view of the crane of FIG. 1.

DESCRIPTION OF THE PREFERRED EMBODIMENTS

Figure 3:
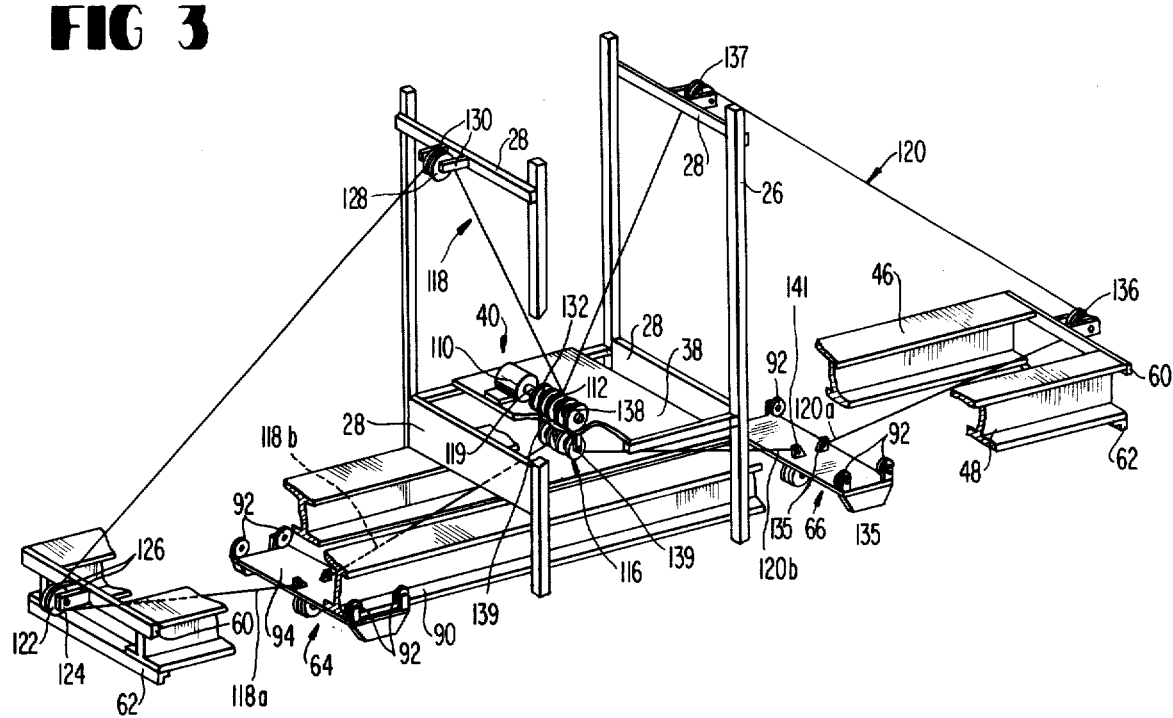
FIG. 3 is a perspective view partially broken away of a portion of the cable stay gantry crane of FIGS. 1 and 2.

Referring to FIG. 1, a cable stay crane constituting one embodiment of the present invention is generally identified by the reference numeral 20 and is illustrated in a fixed environment of use that is, at a fixed terrestial location relative to ground G. The general make-up and operating features closely resemble the cranes of the referred to applications. The operating components form no part of the present invention and are purposely shown and described in general terms.

Figure 4:
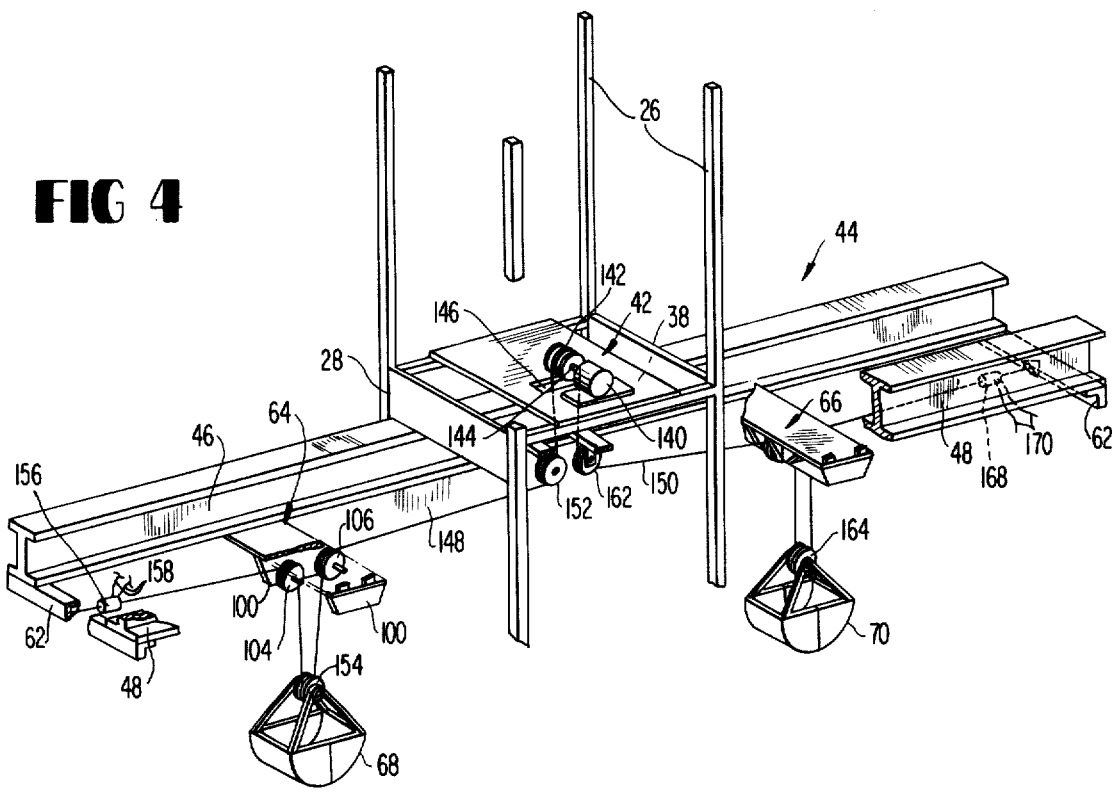
FIG. 4 is a similar perspective view of the portion of the crane shown in FIG. 3 illustrating the lift hoist assembly of the cable stay crane.

The crane 20 is mounted on a suitable base 22 which may comprise a barge or a concrete slab, or the like and extending upwardly from the base is a double post tower indicated generally at 24 and comprising four vertical posts or columns 26 joined horizontally by lateral crossbars 28 and longitudinal crossbars 30. In order to strengthen the double post tower which forms a generally rectangular open frame, there are further provided diagonal cross braces 26 of somewhat lighter, smaller size fixed at respective ends to the columns or posts 26 at the intersection points of the crossbars 28 and 30. While only cross braces 36 are shown which lie intermediate of upper and lower crossbars 30, other cross braces may be employed to rigidify the tower depending upon the loading to which the gantry type crane 20 is subjected. A horizontal platform 38 is positioned in between the columns having its edges supported by laterally spaced crossbars 30. The platform 28 supports both the trolley travel winch assembly 40 and the bucket lift hoist winch assembly 42. FIG. 3 purposely shows only the trolley travel winch assembly 40, while FIG. 4 shows only the bucket lift hoist winch assembly 42 to more clearly illustrate the make-up of these winch assemblies and their cable means. The columns or posts 26, the cross bars 28 and 30, are all formed of stack metal such as solid bars and may be steel I-beams or the like.

The cable stay gantry crane 20 is provided with a gantry indicated generally at 44 which comprises essentially two relatively large bridge beams or I-beams 46 and 48. These are fixedly mounted to the tower 24 at their centers by means (not shown) such that the ends extend in cantilever fashion outwardly of the double post tower 24. The I-beams 46 and 48 pass beneath the platform 38. The gantry 44 formed by the bridge beams or I-beams 46 and 48 is also secured to the tower by means of a series of cable stays 50. A pair of tension head beams 52 and 54 extend between and overlie crossbars 28 at the top of the double post tower 24 and further overlie respective bridge beams 46 and 48. Suitable cable connectors 56 rigidly mount one end of the cable stays 50 to the tension head beams 52 and 54, while triangular shaped brackets 58 which are welded or otherwise fixed to the top of the bridge beams 46 and 48, permits coupling of the other end of the cable stays 50 to the gantry. The cable stays are under tension both in terms of the cantilever load provided by the mass of the gantry itself as well as the load imparted to the gantry by respective load trolleys, buckets, and the bulk material being lifted thereby. The gantry 44 comprises an open box frame in which upper and lower crossbars 60 and 62 respectively fixedly extend from one bridge beam 46 to the other at 48 at respective ends and to rigidify the gantry. The bridge beams or I-beams 46 and 48 define inherently by way of their upper or lower horizontal walls, tracks for horizontally moving load trolleys indicated generally at 64 and 66 to the left and right of double post tower 34, FIG. 1. A principal aspect of the present invention is to provide dual load carrying trolleys which move longitudinally along the gantry 44 in unison but in opposite directions and which are generally maintained at the same relative distance from the double post tower 24 during such movement of the trolleys. The loads are carried by way of buckets 68 and 70 respectively, suspended from trolleys 64 and 66 and movable between loading positions and unloading positions. In FIG. 1, bucket 68 is shown as being suspended above an underlying mound of gravel as at 72, while a second mound of gravel 74 underlies bucket 70, the gravel piles forming bulk load material. In this instance, it is the function of the gantry crane 20 to pick up portions of the bulk load gravel from piles 72 and 74 and to transmit them to an unload position or positions, in this case within the double post tower 24 a hopper 76 which is mounted by means (not shown) beneath the gantry 44 and above the fixed base 22 for receiving and directing the released gravel to conveyor means upon opening of the buckets as shown in dotted or phantom lines at 68a and 70a. In this respect, a conveyor assembly 78 comprising an endless conveyor belt 80 is positioned on the fixed base 22 beneath the hopper 76 with discharge portion 82 of the hopper overlying the belt 80. This permits the gravel to be deposited on the endless conveyor belt 80 for movement in the direction of arrow 84 generally at right angles to the line of travel of the trolleys and buckets from their respective gravel piles 72 and 74 to the tower 24 and the hopper mounted therein. The present invention is illustrated in terms of moving loads inwardly from positions external of the tower 24 to a central position with respect to that tower and between the posts 26. However, material could be removed from transport vehicles centered with respect to the tower on base 22 and transported horizontally along the gantry to positions to each side of the double post tower 24 by respective load trolleys and deposited by dumping the buckets 68 for instance at positions of the gravel piles 72 and 74. Further, it is envisioned that the cable stay gantry crane may be employed in transporting dual loads between two positions, both of which are outside of the double post tower 24. It is, however, the requirement of the present invention that the loads be essentially equal and that the trolleys be maintained at the same relative position with respect to the center line of the double post tower during the movement of the load trolleys between the load and unload positions with respect to the loads carried thereby. In this way, not only is the load on the crance balanced at the time of initiation of such transport, but completely during the transport and the discharge of that load by the buckets or equivalent load supporting members.

Figure 5:
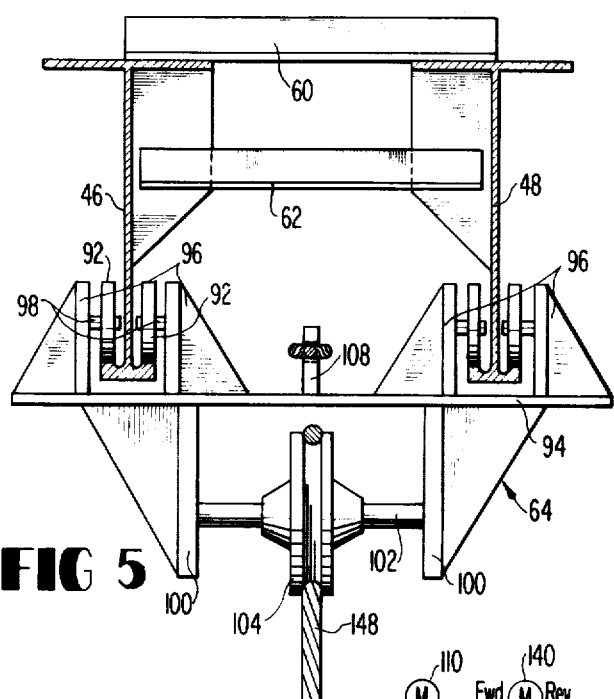
FIG. 5 is a vertical section of the crane of FIG. 1 through one of the load trolleys.

Turning to FIG. 5, the construction and operation of the gantry and the load trolleys may be better appreciated. In that respect, the I-beams 46 and 48 making up the gantry 44 are connected together by various cross bars as at 60 and 62 which may comprise L-shaped metal beams welded to these members to form an open rectangular frame. In one form, the base of each I-beam therefore forms a track 90, on the upper surface of which rests on opposite sides of the vertical wall of respective I-beams 46 and 48 wheels 92 for the load trolleys. In this respect, load trolley 64 comprises a metal plate or base 94 on whose upper surface are mounted laterally opposed sets of brackets 96 which face respective sides of the I-beams 46 and 48 and which support fixed axles 98 upon which rotate the wheels 92. Paired brackets 100 are welded to the bottom surface of the base or plate 94 and support horizontally extending forward and aft axles 102 upon which are mounted for rotation pulleys 104 and 106. The pulleys 104 and 106 form a portion of the hoist cable assembly. Further, forward and aft cable connector plates 108 and 109 are welded to the upper face of the base or plate 94 centered between the bridge beams 46 and 48. In order to move both the troleys 64 and 66 simultaneously in opposite directions at the same speed and maintain their positions equally distant from the center line of the double post tower 24 trolley travel assembly is provided which includes the trolley travel winch assembly 40. Assembly 40 comprises an electrical motor 110 which is mounted on platform 38 and which is coupled and which drives a multiple drum winch 112 by way of drive shaft 114. Mounted beneath assembly 40 is an idler pulley assembly 116 and an opening is provided within platform 38 to permit the various cables to pass through the platform 38 as the winch being driven by motor 110. In this respect, load trolley 64 is driven by motor 110 by way of first trolley travel cable indicated generally at 118 and conversely load trolley 66 to the right of the double post tower 24, FIG. 1, is driven by the same motor but by way of second trolley travel cable indicated generally at 120, FIG. 3. One end 118a of cable 118 is fixed by way of cable mounting plate 108 to the load trolley 64, the cable 118 leading outwardly and parallel to the axis of the gantry where it is trained over an idler pulley 122 mounted for free rotation about its axis by way of shaft 124 on brackets 126, the cable 118 being further trained about the periphery of a second idler pulley 128 mounted for rotation about its axis on brackets 130 which are fixed to a crossbar 28 of the double post tower 24. The trolley travel cable 118 extends downwardly therefrom and is wrapped about drum 132 of the trolley travel winch 112, the cable 118 thence extending through an opening or hole within platform 38 and being trained about the idler pulley 134 and having its other end 118b fixed to connector plate 109 in line with plate 108. Cable 118 essentially forms an endless loop including load trolley 64.

In similar fashion, the trolley travel cable 120 has end 120a fixed to the load trolley 66 at 135, is trained about an idler pulley 136 at the right end of the gantry 44, is further trained about idler pulley 137 centered on crossbar 28 on the left side of the double post tower 24, has multiple turns trained about pulley drum 138 of the trolley travel winch 112 and is trained about a second idler pulley 139 of the idler pulley assembly 116, and has its opposite end 120b fixed at 141 to the load trolley 66 forming a second essentially endless cable loop. The direction in which each cable 118 and 120 is leaved about the drums of the trolley travel winch 112 determines the direction of movement of the load trolleys in response to energization of motor 110. In the manner illustrated in FIG. 3, rotation of motor 110 in one direction will cause both of the load trolleys to move in unison and at the same speed towards the double post tower, while, when the motor 110 is energized to rotate in the opposite direction, the trolleys move at the same rate of speed away from the double post tower.

In order to control the vertical travel buckets 68 and 70 towards and away from respective load trolleys 64 and 66 from which these buckets are suspended, the crane of the present invention may employ a common trolley left assembly which includes the lift hoist winch assembly 42, FIG. 4. Assembly 42 comprises a hoist motor 140 fixedly mounted to platform 38 to the right of the trolley travel winch assembly 40, the motor 140 having fixed thereto a two drum winch 142 supported and driven by shaft 144. An opening 146 is provided within the platform 38, to permit lift cables 148 and 150 for buckets 68 and 70 respectively to pass therethrough. One end of each lift cable is fixed to a respective drum of the winch assembly 42 and wind and unwind thereon. Lift cable 148 extends from its drum downwardly through the opening 146 and is trained about idler pulley 152, idler pulley 106 carried by the load trolley 64, pulley 154 of bucket 68, and reverses its direction to return to the load trolley 64 where it is trained about the second idler pulley 104 of the load trolley and has its opposite end fixed to the lower cross bar 62 at the outboard end of the gantry 44. In the illustrated embodiment, a strain gauge 156 is interposed between the connection point of cable 148 to bar 62 and idler pulley 104 such that the load of the bucket and the bulk material carried thereby is exerted on the strain gauge 156 and a signal indicative of the load carried by bucket 68 is provided electrically to the control circuit of FIG. 8 by electrical leads 158.

The second lift cable 150 has one end fixed to the other drum of the two drum winch 142 for winding and unwinding; the cable passing vertically downward through the hole 146 within platform 38 and being trained about idler pulley 162. Cable 150 then extends horizontally and is trained about the inboard idler pulley 163 of load trolley 66, extends vertically downward and is trained about pulley 164 rotatably carried by bucket 70 for suspending that bucket, and returns vertically upward to the load trolley 66 and is trained over the outboard idler pulley 166 of that member with other end of the lift cable 150 being fixed to the cross bar 62 at the right end of gantry 44. A second stain gauge or load sensor 168 is positioned intermediate of idler pulley 166 and the point of attachment of the end of the lift cable 150 to the cross bar 62 such that the load of material being transported by bucket 70 can be sensed and an electrical signal indicative of that load proportional to that load is sent electrically by leads 170 to the control system illustrated schematically in FIG. 8. For the purpose of description herein, and not by way of limitation, it will be assumed that the gravel from piles 72 and 74 is to be moved form those locations on ground G by the buckets to the endless conveyor belt 80. In that regard, appropriate manual controls (not shown) by the crane operator are actuated to cause the load trolleys 64 and 66 to move to overlying position as shown in FIG. 1, by energization of the trolley travel winch motor 110 through the motor controller 171, FIG. 8. The motor 110 receives its power for forward and reverse operation by way of lines 172 under control of motor controller 171 from power source 174. A load comparator 176 is positioned between the electrical power source 174 and motor controller 170 so as to selectively connect or disconnect the motor controller from the power source, depending upon the loads of respective buckets 68 and 70. During movement of the buckets without load, in this case without bulk material, from the dotted line positions 68a and 70a of FIG. 1 to the full line positions, the comparator 176 senses the lack of bulk material within both buckets 68 and 70. Comparator 176 thus does not interfere with normal operator control of the trolley travel winch motor 110 or the hoist winch motor 140.

Figure 8:
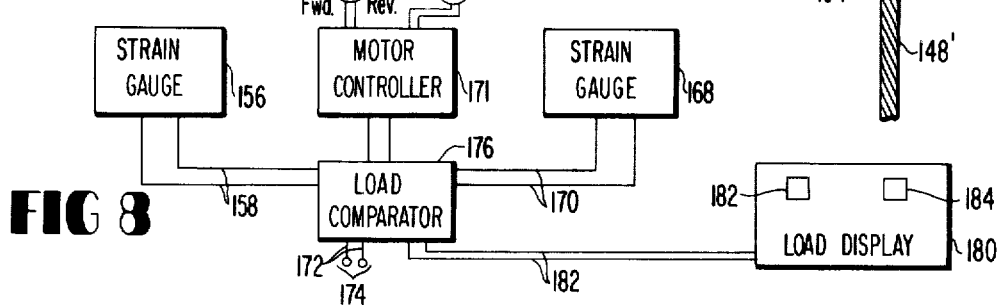
FIG. 8 is an electrical schematic diagram of the motor control circuit for the crane of FIGS. 1 through 2.

As seen in FIG. 8, the strain gauge 156 is connected by way of leads 158 to the load comparator 176 while strain gauge 168 associated with bucket 70 is connected by way of its leads 170 to the load compartor 176. Once the buckets have been moved by energization of motor 110 from the dotted line position of FIG. 1 to their full line positions, the buckets may be lowered onto piles 72, 74 where they can engulf a portion of the gravel. Since the buckets are unloaded, the strain gauge signal should be equal and the comparator 176 should permit the operator of the crane through motor controller 170 to energize the lift hoist winch motor 140 in the desired direction to lower the buckets 68 and 70 simultaneously to permit the buckets to be loaded. Further, controls (not shown) may selectively control the extent of descent of respective buckets 68 and 70, depending upon the size of the gravel piles 72 and 74 or their equivalent loads. Further, by dropping the buckets 68 and 70 to the point where they rest upon gravel piles 72 and 74 with their jaws in open position, the closing of the jaws results in the individual loading of buckets 58 and 60 with gravel. If the buckets are not equally or nearly equally loaded, upon bucket closing the load sensors such as strain gauges 156 and 168 will provide signals of different electrical strength and the load comparator 176 will automatically operate to prevent the lifting of either bucket until such time as the operator through the motor controller 171 re-opens one or both buckets and fills the buckets to acceptable limits. It is envisioned that the comparison need not be exact and that a bucket having 75% of the load of the other bucket for instance, will be acceptable in terms of permitting both buckets to move from the loading area to the discharge area. In this respect, the system of the present invention envisions the utilization of a load display device as at 180, FIG. 8, which is electrically connected by lines 182 to the load comparator 176, the load display being provided with a changeable load indicator as at 182 and 184 for buckets 68 and 70 respectively, the display being adjacent the motor controller 171 and within the view of the crane operator.

While the load measuring or sensing mechanism of the illustrated embodiment is described as being electrical in nature, it can be pneumatic or hydraulic, and any satisfactory simple weighing device may be employed. The load sensing mechanism may comprise strain gauges as shown operatively incorporated within a portion of the cable to which the load is subjected, as near the end of the cable, or it may be incorporated within the trolley or the bucket itself. It is not envisioned that the arrangement of the present invention need incorporate a tilt sensing mechanism such as that disclosed in the copending application filed Feb. 24, 1976, entitled "Cable Stay Crane" since the load comparator will automatically keep the crane in balance at all times.

Figure 7:
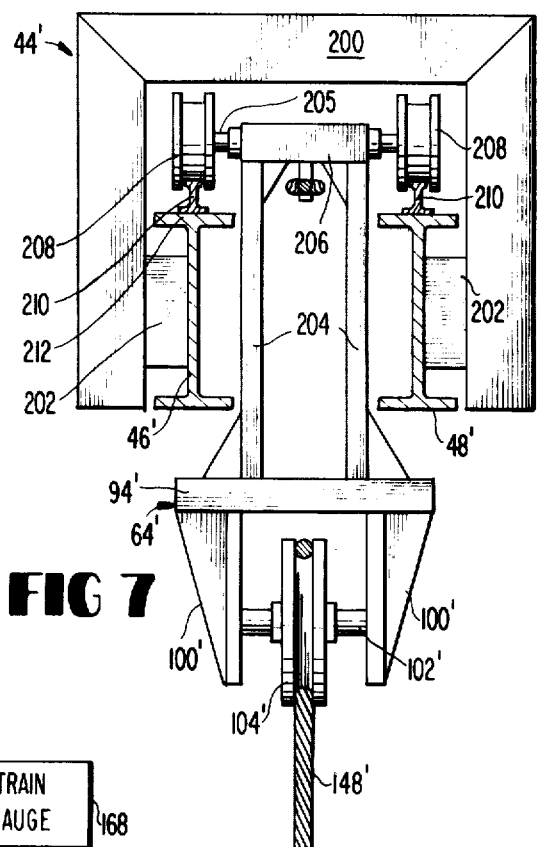
FIG. 7 is a vertical section of a modified embodiment of the invention illustrating a different form of gantry and load trolley.
Figure 6:
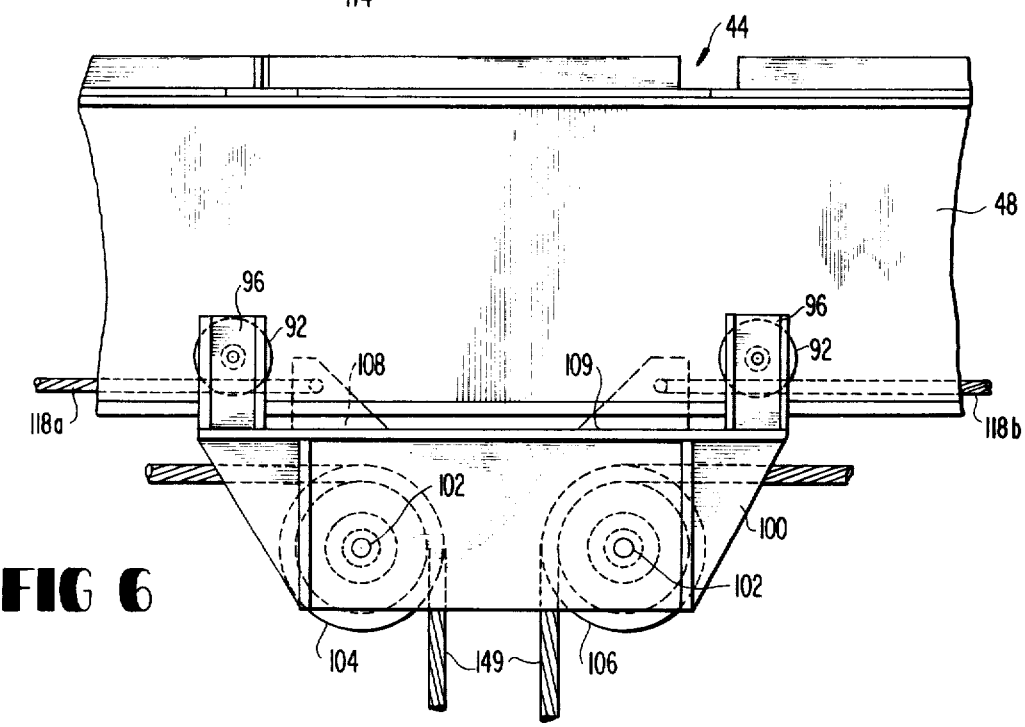
FIG. 6 is an enlarged side elevational view of a portion of the crane shown in FIG. 1 illustrating one of the load trolleys.

Reference to FIG. 7 illustrates a modified form of the gantry and one of the trolleys positioned thereon. In this respect, the gantry 44' comprises opposed bridge beams or I-beams as at 46' and 48' being fixedly mounted to an inverted U-shaped frame member 200. The frame member 200 may be of welded metal bars with respective I-beams being mounted thereto within the center of the same by side plates 202. Trolley 64' in this case is somewhat narrower and comprises a thick base plate 94' haing vertical risers 204 which support a single shaft 205 for rotation horizontally about its axis by means of bearing 206. On respective ends of shaft 204, there are provided flanged wheels 208 which ride upon steel rails 210 which in turn are supported on the upper horizontal plate portions 212 of the I-beams 46' and 48'. The trolley 64' in this case remains centered within the opening defined by frame 200 and between the laterally spaced I-beams 46' and 48'. Depending brakcets 100' support a pair of shafts 102' corresponding to shafts 102 of the load trolley 64 of FIG. 6 upon which are rotatably mounted the idler pulleys, one of which at 104' has trained thereabout a lift hoist cable 148'. The members of the modified trolley and gantry of FIG. 7 being essentially the same and for performing the same function as those members shown in the first embodiment illustrated in FIG. 5.

It is important to realize, that the buckets which move towards and away from each other simultaneously in opposite directions with reference to the center line of the tower, from that center line to extreme outboard positions as defined by the ends of the gantry, act as counterweights to each other and if the buckets are equally or near equally loaded, the forces exerted on the gantry and taken up by the cable stays will be balanced, at all times. This permits the crane to accept heavier than normal loads without any possibility of toppling of the crane to one side or the other absent a loss of load.

What is claimed is:

1. A balanced double load gantry crane comprising:
   a base,
   a tower mounted on said base and extending substantially vertically upwards therefrom,
   a gantry mounted to said tower above said base and having portions extending horizontally outward from opposite sides of said tower in cantilever fashion,
   trolleys mounted on respective sides of said tower for movement horizontally along said gantry,
   a load carrying member for each trolley,
   a trolley lift assembly including a first drive means and vertically movable hoist cable means operatively connecting said load carrying members and said trolleys respectively for suspending said load carrying members from said trolleys and for raising and lowering said movable hoist cable means and said load carrying members,
   a trolley travel assembly including a second drive means and travel cable means coupling said trolleys to said second drive means for moving said trolleys simultaneously along said gantry in opposite directions at the same speed and at the same relative distance from said tower,
   means for measuring the load imparted by the load carrying members on said crane through said trolleys,
   comparator means for comparing said loads,
   a power source for said drive means, and
   means responsive to said comparator means for controlling operation of said at least first drive means to prevent lifting of said loads unless said loads are substantially equal.

2. The invention of claim 1, wherein said first and second drive means comprise motors and said means responsive to said comparator means for controlling operation of said at least first drive means comprises means for controlling the connection between said power source and said motor of said at least first drive means.

3. The invention of claim 2, wherein said power source comprises a source of electrical power and said motors of said first and second drive means comprise electrical motors.

4. The invention of claim 1, wherein said tower extends vertically upwards beyond said gantry and a plurality of cable stays are fixed at one end to the top of said tower and at theeir other end to said gantry at positions on both sides of said tower to transmit load from said gantry to said tower under applied tension.

5. The invention of claim 2, wherein said tower extends vertically upwards beyond said gantry and a plurality of cable stays are fixed at one end to the top of said tower and at their other end to said gantry at positions on both sides of said tower to transmit load from said gantry to said tower under applied tension.

6. The invention of claim 3, wherein said tower extends vertically upwards beyond said gantry and a plurality of cable stays are fixed at one end to the top of said tower and at their other end to said gantry at positions on both sides of said tower to transmit load from said gantry to said tower under applied tension.

7. The invention of claim 6, wherein said trolley lift assembly comprises a single electric motor and a multiple drum winch coupled to said motor, and said vertically movable hoist cable means comprises individual cables connecting a given load carrying member to a given drum for winding and undwinding thereabout, and wherein said motor and said multiple drum winch is mounted within said tower and between said base and in juxtaposition to said gantry.

8. The invention of claim 7, wherein said trolley lift assembly comprises a common multiple drum winch operatively coupled to said electrical motor comprising said first drive means and said vertically movable hoist cable means comprises individual cables fixed at one end to said gantry and being fixed at their other end to given drums of said multiple drum winch, and wherein said trolley and said load carrying members comprise pulleys, and said cables are trained about the pulleys to suspend said load carrying members beneath said trolleys for vertical movement therebetween simultaneously upon energization of said electrical motor of said first drive means.

9. The invention of claim 8, wherein said means for measuring the load imparted by the load carrying members on the crane comprises strain gauges operatively mounted on said cables to measure the applied load on said cables through said trolleys, and said comparator means comprises means for comparing signals emanating from said strain gauges indicative of applied loads.

* * * * *